United States Patent Office 2,791,487
Patented May 7, 1957

2,791,487
PROCESS FOR THE MANUFACTURE OF ALKALI METAL FLUOTITANATES

Jonas Kamlet, New York, N. Y., assignor to National Distillers Products Corporation, New York, N. Y., a corporation of Virginia No Drawing. Application June 23, 1954, Serial No. 438,874

4 Claims. (Cl. 23—88)

This invention relates to a process for the manufacture of alkali metal fluotitanates. More particularly, it relates to a process whereby alkali metal fluotitanates can be manufactured from cheap and readily available raw materials.

Titanium metal can be manufactured by the reduction of anhydrous sodium fluotitanate or potassium fluotitanate with sodium metal, according to the equations:

$$Na_2TiF_6 + 4Na \rightarrow 6NaF + Ti$$
$$K_2TiF_6 + 4Na \rightarrow 2KF + 4NaF + Ti$$

It is necessary to use the sodium in slight stoichiometric excess. After separation of the titanium metal, there remains behind a slag of fluoride salts, either molten or solid. This slag consists of sodium fluoride (if $Na_2TiF_6$ was used originally), or of a mixture of one mole of potassium fluoride to two moles of sodium fluoride (if $K_2TiF_6$ was used originally). In both cases, the slag will also contain small amounts of excess unreacted sodium metal.

It is one purpose of this invention to provide a relatively simple procedure whereby this slag of fluoride salts may be converted to the original sodium fluotitanate or potassium fluotitanate.

It is a further purpose of this invention to provide a process for the manufacture of sodium fluotitanate or potassium fluotitanate, of high purity, suitable for use in the chemical or electrolytic manufacture of titanium metal, from cheap and readily available raw materials and, particularly from technical crude titanium salt solutions.

Thus, it has been found that sodium fluotitanate and potassium fluotitanate may be obtained in good yield by the reaction, in an aqueous medium, of the corresponding alkali metal fluoride with titanic sulfate, according to the equations:

$$6NaF + Ti(SO_4)_2 \rightarrow Na_2TiF_6 + 2Na_2SO_4$$
$$6KF + Ti(SO_4)_2 \rightarrow K_2TiF_6 + 2K_2SO_4$$

Particularly suitable for use in the process of this invention is the mixture of one mole of KF and two moles of NaF obtained as a by-product slag in the process for the manufacture of titanium metal by the sodium metal reduction of potassium fluotitanate. This by-product mixture reacts with titanic sulfate according to the equation:

$$2KF + 4NaF + Ti(SO_4)_2 \rightarrow K_2TiF_6 + 2Na_2SO_4$$

Potassium fluotitanate is markedly less soluble than the sodium salt. The formation of a considerable by-product of sodium sulfate by this reaction further serves to "salt out" or insolubilize the $K_2TiF_6$. Thus, the use of this slag of 1KF/2NaF gives particularly good yields of $K_2TiF_6$ by the process of this invention.

The reaction of this invention is effected in an aqueous medium. If potassium fluoride is employed, it will dissolve readily in the medium. If sodium fluoride is used, it may remain partially undissolved, or as a slurry, due to the low water solubility of the salt. If a mixture of KF and NaF (e. g. the slag from the titanium metal process above described) is employed, part of the fluoride salt will dissolve in the aqueous medium and part will remain in suspension as a slurry. If a slag from the titanium metal process is used, this will usually contain a small amount of excess unreacted sodium metal. On addition to the aqueous medium, the excess sodium metal will, of course, react with the water to form sodium hydroxide.

The reaction of the fluoride salt solution-suspension with the titanic sulfate may be effected at any temperature between 10° C. and the boiling point of the reaction mixture. It is preferred to effect the reaction at a temperature between 70° C. and 105° C. and thereafter to cool and, if necessary, to concentrate the reaction mixture in order to precipitate the alkali metal fluotitanate and separate it from the concomitant by-product of alkali metal sulfate.

Sodium fluotitanate is soluble in water at 20° C. to the extent of 60–70 grams per liter, potassium fluotitanate to the extent of 11–13 grams per liter, and these solubilities are further diminished by the "salting-out" effect of the alkali metal sulfates produced as products of the reaction of this invention.

It is essential that the reaction of this invention be effected in an acidic medium. In an alkaline medium, alkali metal fluotitanates will hydrolyze with the precipitation of hydrated titanium dioxide. Furthermore, an acidic reaction mixture is necessary to avoid precipitation of any iron compounds with resulting contamination of the precipitated alkali metal fluotitanate.

Titanic sulfate, or titanium disulfate—$Ti(SO_4)_2$—can be obtained by the action of hot sulfuric acid or oleum on titanium dioxide. It exists as the anhydrous salt and also in the form of a number of hydrates.

It has also been found possible to use titanium oxytrisulfate ($Ti_2O(SO_4)_3$) and titanyl sulfate ($TiOSO_4$), or the hydrates thereof, in the process of this invention:

$$12NaF + Ti_2O(SO_4)_3 + H_2SO_4 \rightarrow$$
$$2Na_2TiF_6 + 4Na_2SO_4 + H_2O$$
$$2KF + 4NaF + TiOSO_4 + H_2SO_4 \rightarrow$$
$$K_2TiF_6 + 2Na_2SO_4 + H_2O$$

These basic titanium sulfates may be prepared by the hydrolysis of titanic sulfate or by the controlled reaction of titanium dioxide with sulfuric acid.

A mixture of titanium dioxide and sulfuric acid may also be used in the process of this invention. Thus, NaF, KF, or a mixture of NaF and KF may be digested with $TiO_2$ and $H_2SO_4$ in an acidic medium, preferably at 70° C. to 105° C., to give the corresponding alkali metal fluotitanate, according to the reaction:

$$6NaF + TiO_2 + 2H_2SO_4 \rightarrow Na_2TiF_6 + 2Na_2SO_4 + 2H_2O$$
$$2KF + 4NaF + TiO_2 + 2H_2SO_4 \rightarrow K_2TiF_6 + 2Na_2SO_4 + 2H_2O$$

As noted in the above equation the minimum amount of sulfuric acid which is necessary is that which would be required to convert all the titanium compounds to titanic sulfate $Ti(SO_4)_2$ and in addition maintain an acidic reaction mixture. Thus, there must be sufficient additional sulfuric acid to neutralize any free caustic as might be formed by reaction of water with the excess sodium present in the slag from sodium reduction of the alkali fluotitanate. This is essential in order to avoid precipitation of the iron salts which may be present and to avoid hydrolysis of the product alkali metal fluotitanate.

The titanium dioxide used in this modification may be in the form of anatase, brookite, rutile, as amorphous metallurgical grade titanium dioxide, as a concentrate derived by chemical beneficiation (e. g. the high titania slag derived as a co-product in the electrothermal smelting of ilmenite), or as a low-iron titania concentrate obtained by chemical processing. An excellent and highly reactive form of titanium dioxide for use in this modification of the process is the hydrated titanium dioxide (titanic acid or metatitanic acid) derived by the hydrolysis of titanium salts (such as $Ti(SO_4)_2$ or $TiCl_4$) and now manufactured in large tonnages as intermediates in the preparation of pigment grade titanium dioxide.

A preferred embodiment of the process of this invention involves the use of the crude technical solution of titanic sulfate, which may contain considerable amounts of iron sulfates and as obtained in the Washburn process for the manufacture of titanium dioxide. Ilmenite (or a high-titania iron-oxide containing ore or slag) is ground, digested with concentrated sulfuric acid, diluted with water, treated with a reducing agent to convert ferric sulfate to the ferrous state, clarified by the addition of antimony sulfide and a proteinaceous material which serve to carry down all suspended matter, cooled to separate and crystallize out a large portion of the ferrous sulfate in the solution, and thereafter filtered to separate the filtrate of titanic sulfate.

The solution at this stage will contain 420 to 450 gms. $Ti(SO_4)_2$, 80 to 85 gms. $FeSO_4$, and 65 to 70 gms. free $H_2SO_4$ per liter. This solution may be further concentrated in lead-lined evaporators to approximately 600 gms. $Ti(SO_4)_2$, 160 gms. $FeSO_4$, and 70 gms. free $H_2SO_4$ per liter. Either of these technical solutions may be used as a source of titanic sulfate in the process of this invention. As long as the reaction mixture is maintained in the acidic state, the iron salts show no tendency to precipitate, and the alkali metal fluotitanates are precipitated in a state of high purity. The ferrous sulfate remains dissolved in the filtrate and in no way interferes with the recovery of the alkali metal fluotitanate.

Thus, it becomes feasible by this process to make alkali metal fluotitanates employing the cheapest technical form of titanium salt solution now industrially available, i. e. the crude $FeSO_4$-containing ttianic sulfate solution of the Washburn process. This solution is often concentrated further, cooled and filtered to remove more $FeSO_4$, and finally allowed to form a solid cake containing the equivalent of about 20% $TiO_2$, 50% $H_2SO_4$, and 30% water and ferrous sulfate, proportions corresponding approximately to $Ti(SO_4)_2 \cdot 9H_2O$ in composition. This cake is also ideally suitable for use in the process of this invention. All present processes for the manufacture of titanium metal require the use of a highly purified titanium salt as a starting material, including the process in which the sodium reduction of alkali metal fluotitanate is employed. It is therefore highly important to stress that such high purity alkali metal fluotitanates may be obtained by the process of this invention. There can also be used as raw material the crude $FeSO_4$-containing titantic sulfate solutions such as are obtained in the widely practiced Washburn process.

The following examples are given to define and to illustrate in more detail the present invention but are in no way intended to limit it to reagents, proportions or conditions described therein. Obvious modifications will occur to any person skilled in the art. All proportions given are in parts by weight.

*Example I*

241 parts of $K_2TiF_6$ is reacted under critical conditions with 106 parts of sodium metal to yield 45.5 parts of titanium metal and about 300 parts of a slag containing KF, NaF and a little unreacted sodium metal. This slag is crushed, ground and made into a solution-suspension by addition to 1000 parts of water.

The resultant reaction mixture will contain 168.0 parts of sodium fluoride (4 moles), 116.2 parts of potassium fluoride (2 moles) and 24.0 parts of sodium hydroxide (0.6 mole) in 1000 parts of water.

To this solution-suspension, there is added 400 parts of the technical $Ti(SO_4)_2$ solution (containing 240 parts of actual $Ti(SO_4)_2$, i. e. (1.0 mole), 64 parts of $FeSO_4$ and 28 parts free $H_2SO_4$ (0.3 mole). An additional 77 parts of 66° Bé. $H_2SO_4$ (0.7 mole) is added to neutralize the free caustic soda and provide an acidic reaction medium. The reaction mixture is then heated under reflux at 70° C.–105° C. for two to four hours, and is then cooled to 10°–20° C. The precipitated potassium fluotitanate is then filtered off, washed with water until the wash water is free of ferrous ion. The potassium fluotitanate forms a monohydrate, which loses its water of crystallization by drying at temperatures above 35° C. The yield of anhydrous potassium fluotitanate is 230.0 parts equivalent to a yield of 95% of theoretical.

From the filtrate, 275 parts of salt cake may be recovered by well known procedures of concentration and crystallization.

*Example II*

The source of titanium dioxide used in this example is the thickened filter-press pulp containing the equivalent of about 15% $TiO_2$, in the form of metatitanic and titanic acids (i. e. hydrated forms of $TiO_2$) obtained in the Washburn process by hydrolysis of the crude $Ti(SO_4)_2$ solution, filtration and washing of the precipitate.

A reaction mixture is prepared of 252 parts of sodium fluoride (6 moles), 275 parts of 66° Bé. sulfuric acid (2.5 moles) and 533 parts of filter-press pulp containing the equivalent of 80 parts of $TiO_2$ (1 mole). The reaction mixture is heated at 90°–105° C. for six hours, and is then diluted with 500 parts of boiling water. The reaction mixture is then boiled under reflux for six hours longer, cooled to room temperature and filtered. The filtercake is washed with a little water and is then dried. The yield of sodium fluotitanate thus obtained is 154 parts. On concentration and crystallization of the filtrate, an additional crop of 31 parts of $Na_2TiF_6$ may be recovered for a total yield of 185 parts, equivalent to 89% of theoretical.

By further concentration and crystallization of the filtrate, 275 parts of salt cake can also be recovered as a by-product.

What is claimed is:

1. A process for the production of an alkali metal fluotitanate which comprises reacting an alkali metal fluoride selected from the group consisting of sodium fluoride, potassium fluoride, and mixtures thereof, and titanium dioxide in the ratio of at least six molar equivalents of the alkali metal fluoride for each molar equivalent of titanium dioxide, in an aqueous reaction mixture in the presence of sulfuric acid in an amount at least equal to that which would be required to convert all the titanium dioxide to titanic sulfate, meanwhile maintaining the reaction mixture acidic at all times and separating an alkali metal fluotitanate from the resulting mixture.

2. A process according to that described in claim 1 in which the alkali metal fluorides are by-products obtained from the reaction of potassium fluotitanate and sodium metal and consist substantially of a mixture of potassium fluoride and sodium fluoride in the ratio of one mole of potassium fluoride to two moles of sodium fluoride.

3. A process according to that described in claim 1 in which the alkali metal fluorides are by-products obtained from the reaction of sodium fluotitanate and sodium metal and consist substantially of sodium fluoride.

4. A process according to that described in claim 1 in which the reaction is carried out at a temperature between 70° C. and 105° C.

References Cited in the file of this patent
UNITED STATES PATENTS

| | | |
|---|---|---|
| 2,475,287 | Kawecki | July 5, 1949 |
| 2,694,617 | Cardon et al. | Nov. 16, 1954 |

FOREIGN PATENTS

| | | |
|---|---|---|
| 574,832 | Great Britain | Jan. 22, 1946 |